United States Patent [19]
Mantani

[11] Patent Number: 5,291,011
[45] Date of Patent: Mar. 1, 1994

[54] PHOTOSENSOR CONTROLLER FOR MUSICAL INSTRUMENT HAVING A DRIVING MEANS FOR DRIVING A SUBSEQUENT PAIR OF LUMINESCING MEANS AND DETECTING MEANS IN SEQUENCE

[75] Inventor: Rokurota Mantani, Hamamatsu, Japan

[73] Assignee: Yamaha Corporation, Hamamatsu, Japan

[21] Appl. No.: 957,670

[22] Filed: Oct. 7, 1992

[30] Foreign Application Priority Data

Oct. 7, 1991 [JP] Japan .................... 3-259451

[51] Int. Cl.[5] ........................... H01J 40/14
[52] U.S. Cl. .................. 250/208.3; 250/221; 250/229; 341/31; 84/462
[58] Field of Search ........... 250/208.3, 208.2, 208.4, 250/221, 222.1, 229; 341/31; 356/28; 84/462, 609, 650, 304, 345

[56] References Cited
U.S. PATENT DOCUMENTS 4,970,928 11/1990 Tamaki ............................ 84/462
5,130,532 7/1992 Clemens ......................... 250/221

Primary Examiner—David C. Nelms
Assistant Examiner—Que T. Le
Attorney, Agent, or Firm—Graham & James

[57] ABSTRACT

A photosensor controller is described comprising sensor units 17-0 to 17-7, 18-0 to 18-7, 19-0 to 19-7 and a circuit 16 driving light emitting diodes by a method of time division. Each sensor unit comprises pairs of an LED and a photodiode. After the driving circuit 16 turn on the proceeding LED, if turns off the next LED for a period corresponding to the delay time constant of a detected signal from a photodiode which corresponds to "OFF", making a completely to "0" in this off period of turning off, even in case of waveform rounding. Following this, the next LED is turned on.

7 Claims, 6 Drawing Sheets ced content.

PHOTOSENSOR CONTROLLER FOR MUSICAL INSTRUMENT HAVING A DRIVING MEANS FOR DRIVING A SUBSEQUENT PAIR OF LUMINESCING MEANS AND DETECTING MEANS IN SEQUENCE

BACKGROUND OF THE INVENTION

1. Field of the Invention

The invention relates to a controller for use with photosensors to pick up the states of control elements, such as the keys of a player piano.

2. Related art of the invention

In general, a player piano has photosensors corresponding to its own control elements such as keys, the photosensors being controlled by the method of sequentially scanning, to detect the states of the control elements.

FIG. 5 shows a circuit schematic of a sensor unit of a photosensor controller. The driving circuit which is not indicated in FIG. 5 controls the turning on or off of all of the light emitting diodes (LED). A photodiode (PD) 2-1 receives the luminescence of the LED 1-1. A shutter 3-1 provided for a key corresponding to a note C# interrupts the luminescence of the LED 1-1 when the key is stricken by an operator.

Events of the key corresponding to the note C# are detected by the LED 1-1, the PD 2-1 and the shutter 3-1. Similarly, events of the key corresponding to a note D are detected by the LED 1-2, the PD 2-2 and the shutter 3-2, and the events of the key corresponding to a note D# are detected by the LED 1-3, the PD 2-3 and the shutter 3-3. Thus, each of 12 groups of an LED, a PD and a shutter is provided for detecting an event in the key for an octave.

Each of the PDs is connected to a power supply Vcc and a node A. The node A is directly connected to a negative input terminal of an operational amplifier 4, and is also connected to the ground via a resistor RL. The threshold voltage Vth is supplied to a positive input terminal of the amplifier 4. The output of the amplifier 4 is directly connected to a node B, and is also connected to the power supply Vcc through a resistor R lest the output be unstable.

If the level of the node A is higher than that of the threshold voltage Vth, the level of the node B will be the high voltage state ("H"). As shown in FIG. 5, the sensor unit 5 includes LEDs 1-1 to 1-12, PDs 2-1 to 2-12, shutters 3-1 to 3-12, an operational amplifier 4 and resistors.

Referring to FIG. 6, a timing chart of the sensor unit 5 is shown. As indicated in this drawing, the driving circuit supplies a periodic pulse signal one by one to the LEDs. For example, the LED 1-2 turns on as soon as the LED 2-1 turns off. Thus, the events of the keys are sequentially scanned.

For the purpose of explanation, the key depressed shall correspond to the note D. In other words, the luminescence of the LED 1-2 shall be interrupted by the shutter 3-2. In this case, at the luminescence timing of LED 1-1 and 1-3, which correspond respectively to PD 2-1 and 2-3, PD 2-1 and 2-3 receive the light from the respective LED. However, because PD 2-2 does not receive light at the luminescence timing of LED 1-2, the voltage level of the node A becomes "0" (low state) at the portion corresponding to the luminescence timing of LED 1-2, as is shown in FIG. 5. Through a comparison of the level of the node A and the threshold voltage Vth by the operational amplifier 4, output signal B is obtained.

The output signal B is sampled by sampling pulses which are placed at center of the luminescence timings. Each of sampling pulses is short in comparison with the luminescence timing. Thus, an event in the key corresponding to the note D is detected by a comparison between the sampling results and the luminescence timing of the LEDs.

One problem associated with LED or PD, is that considerable variation in characteristics between devices exist. If, for example, variation in the luminescence energy between the LEDs exists, a difference is generated in the potential between the cathodes of the PDs. Moreover, this difference in potential is also generated by the light receiving characteristics of the PDs themselves.

By the time constant constituted from the load resistor RL and the junction capacitor of the PD itself, the rise and fall portions of the waveform at the node A, as indicated in FIG. 6, come to round. When rounding becomes severe, because, while the timing in comparison to the output at node A is delayed by delta t, the timing attains the voltage threshold value Vth. This characteristic of delay determines delay time constant. It is still possible to detect the events of keys by supplying the sampling pulse after the elapse of delta t.

However, if differences between output voltages at the PDs exist due to the aforementioned variation in the PDs, another problem referred to as "cross talk" arises. In other words, when continuous keys are in "OFF" state, for example when neighboring shutters such as shutters 3-2 and 3-3 dont't block the light of LEDs 1-2 and 1-3, a step differential is generated at the output level of node A (omitted from the figures), causing a mutually deterrent effect.

The delay delta t, cannot be ignored to the extent that the speed (frequency) of the scanning of the keys increases. In the worst case, before the elapse of the delay delta t, the next key is scanned, and thereby, the output B cannot follow the scanning speed and does not change. Therefore, in this case, it is impossible to detect key events.

One idea associated with the improvement of the delta t is that an LED of the high luminous efficacy type or a PD of the high speed response type is used to detect the event. However, problems associated with this idea include the fact that such an LED or a PD is very expensive and that, if a large current flows through such devices, the reliability and the endurance of the devices decrease.

SUMMARY OF THE INVENTION

The object of the present invention is provide a controller for photosensors which may be constructed without using the above devices to raise the scanning speed without generating cross talk, even if variation in its own characteristics, such as the luminous energy of the LED or the sensitivity of the PD, exists.

One advantage of the present invention is that the load for a luminescing means is decreased by a repeatedly turned on and off scanning method, thereby shortening the period during which the luminescing means is turned on.

And also, because the luminescing means is turned off before the next element is scanned, the output waveform of the corresponding luminescence detecting means decreases completely during the off period, regardless of waveform rounding. Therefore, cross talk does not arise.

If an optical device having a high luminescence efficacy and little variation is utilized, the output waveform of the PD is made uniform, therefore making it possible to further increase the key scanning speed.

Further advantages and objects of the present invention will become apparent from the following description of a preferred embodiment, taken in conjunction with the appended claims.

DETAILED DESCRIPTION OF THE PREFERRED EMBODIMENT

The preferred embodiment of the photosensor controller of the invention is intended for use with automatic musical instruments, and more specifically with player pianos, although it is usable in other instruments for controlling photosensors.

Figure 1:
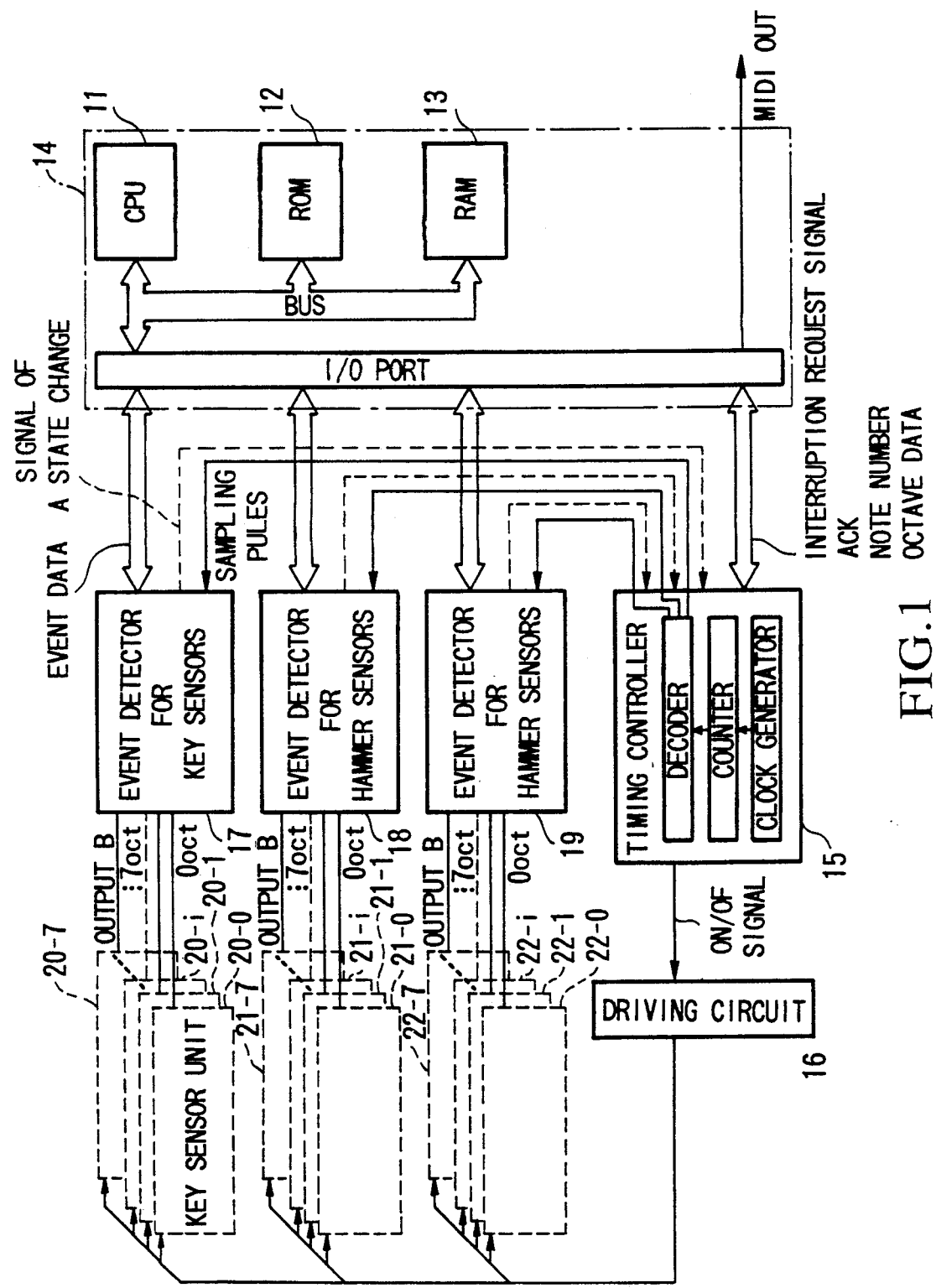
FIG. 1 is a block diagram of a typical photosensor controller of the invention.

FIG. 1 shows a block diagram of a typical photosensor controller of the invention. A central processing unit (CPU) 11 connected to several devices through a (control or address) bus executes some various operations. A read only memory (ROM) 12 stores programs for the CPU 11 and a table. The table provides the relation between the difference in detection time and the velocity of the hammer head (shown below). A random access memory (RAM) 13 temporarily stores the various results of operations or data.

As shown in FIG. 1, the data processing unit 14 includes CPU 11, ROM 12, RAM 13, a bus and an I/O (input-output) port.

A timing controller 15 includes a clock generator, a counter and a decoder. The counter counts the clock, the decoder generates an on/off signal and the sampling pulse, and supplies the former to the driving circuit 16, and the latter to each event detector (shown below). The driving circuit 16, under the control of the on/off signal, drives the LED of each sensor unit by the method of time division.

The event detector 17 for the key sensors supplies the event data showing each output signal B of the key sensor units to the data processing unit 14, and supplying a signal of a state change to the timing controller 15 when the output signal B of this scanning changes as compared to the state of the previous scanning. Each of the event detectors 18 and 19 for hammer sensors, as well as the event detector 17, supplies the event data to the data processing unit 14 and supplying the signal of a state change to the timing controller 15.

Figure 5:
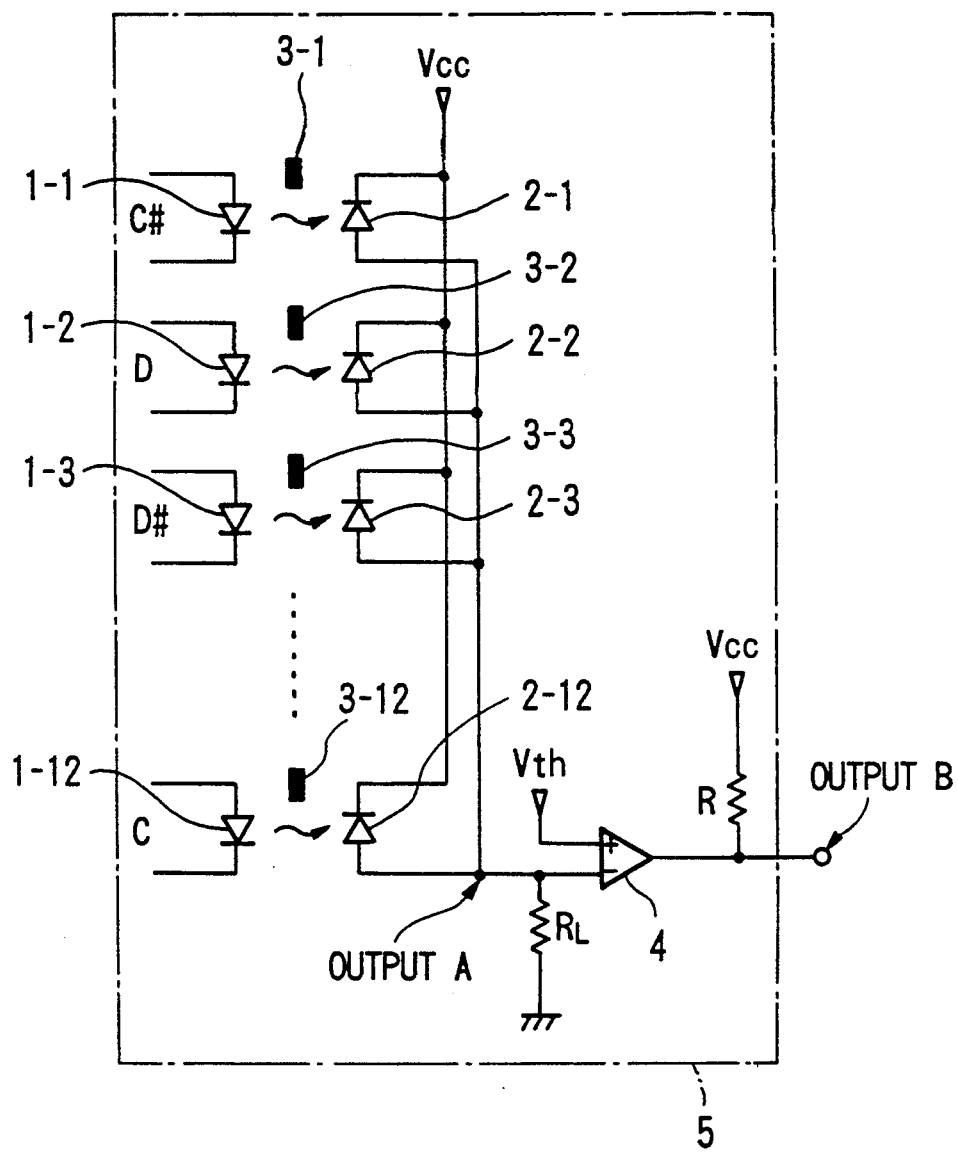
FIG. 5 is a schematic circuit of the sensor unit of FIG. 1.
Figure 6:
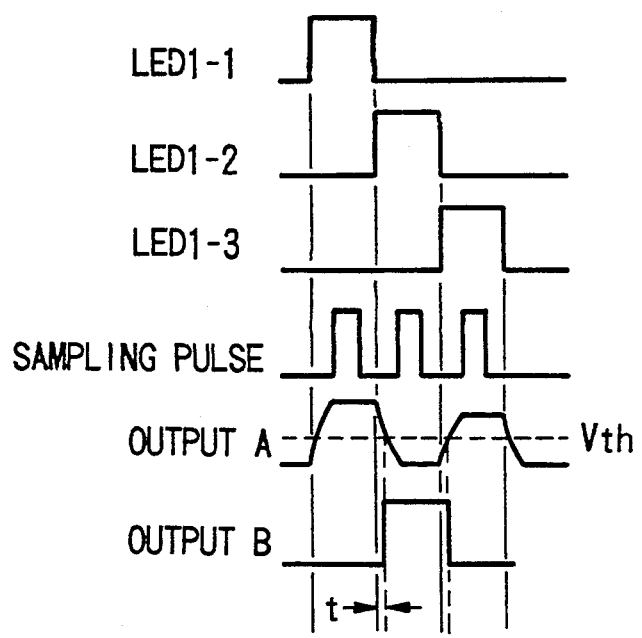
FIG. 6 is a timing chart showing the operation condition showing the operation condition according to the prior art.

The key sensor units 20-0 to 20-7, 21-0 to 21-7 or 22-0 to 22-7 correspond to the sensor unit shown as FIG. 5. 20-i (i=0,1, ... 7) indicates the sensor unit for detecting the key events of the ith octave, its output signal B being supplied to the ith octave input of the event detector 17 for the key sensor. Similarly, each of 21-i and 22-i indicates the sensor unit for detecting the velocity of the hammers corresponding to keys of the ith octave, its output signal B being supplied to the i oct input of the event detector corresponding to the key sensor unit.

Figure 2:
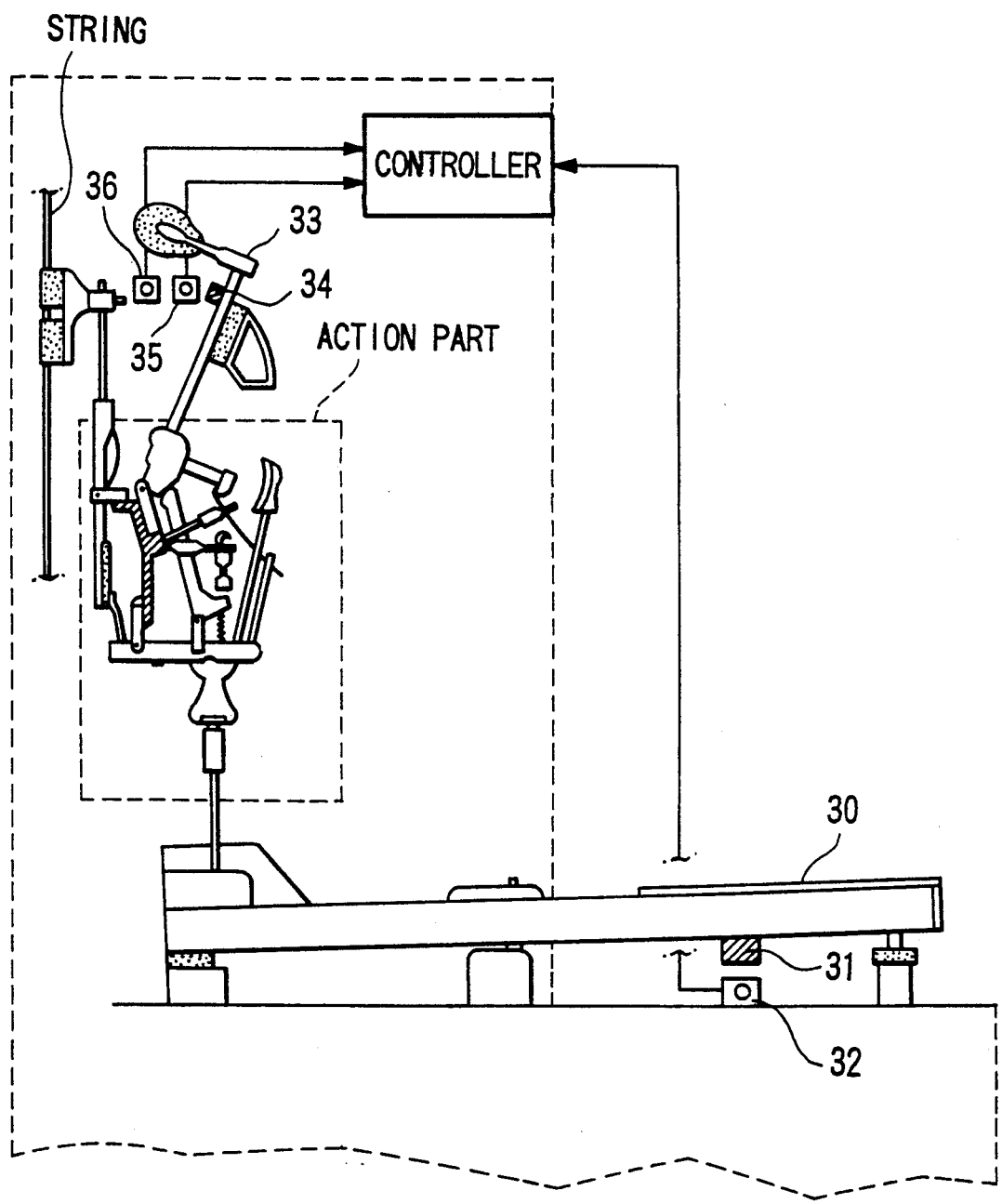
FIG. 2 is a partially schematic sectional view showing the action part corresponding to one key of the player piano.

FIG. 2 shows a partially schematic sectional view showing the action part corresponding to one key of the player piano, having eight octaves of keys. A shutter 31 is mounted at the back portion of a key 30 of the player piano. A key sensor 32 includes an LED and a photodiode. The events of the key 30 are detected by the shutter 31 and the key sensor 32.

The hammer head 33 is connected to the key 30 through an action part. If the key 30 is struck by the operator, the hammer head 33 with a shutter 34 for photosensors will strike a string. Each of the first sensor 35 or the second sensor 36 as well as the key sensor 32 includes a PD and an LED, and both sensors 35 and 36 are provided to detect the velocity of the hammer head 33 striking the string.

A sensor unit for one octave of keys will be explained. As one octave is comprised of 12 keys (note C#, D, ... , C), the sensor unit 20-i includes the key sensors corresponding to notes. The electrical arrangement of this sensor unit 20-i for the keys is the same as shown in FIG. 5.

Similarly, the sensor unit 21-i is formed of 12 pairs of the first sensors 35 of the ith octave, the sensor unit 22-i being formed of 12 pairs of the second sensors 36 of the ith octave.

Figure 3:
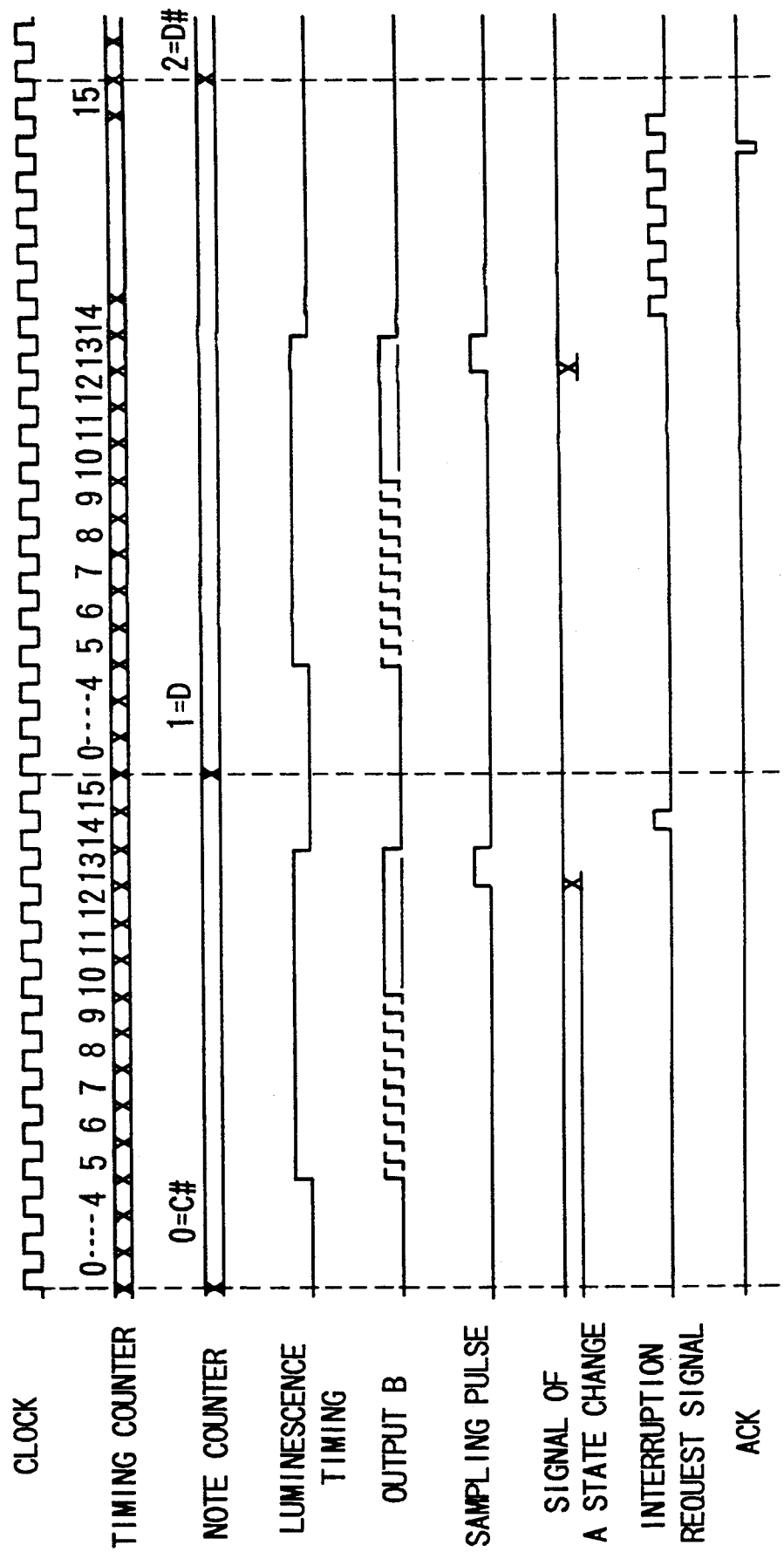
FIG. 3 is a timing chart showing the operation condition of the controller of FIG. 1.

The operation of the above controller is as shown in FIG. 3. By the counter, the clock is counted up so that the note counter repeatedly changes, note C# (0), note D (1), note D# (2), ... , note C(11), note C# (0). Here, the luminescence timing is between 5 and 13 at the counter. When the clock attains the luminescence timing, the timing controller 15 supplies the on-signal to the driving circuit 16, thereby driving the LED relevant to the note counter states. Further, the timing controller 15 supplies the sampling pulse to each of the event detectors at the last luminescence timing (the timing 13) before the LED turns off.

Thus, to each of the event detectors, the output signal B per octave is supplied, being sampled by the sampling pulse (at the timing 13). When the sampling result differs from the previous one, a status variation signal is supplied to the timing controller 15 from the event detectors relevant to the events.

If the timing controller 15 receives the status variation signal, an interrupt request signal is supplied to the data processing unit 14, and an off signal is supplied to the driving circuit 16. As a result, the LED turns off and the key scanning pauses.

Figure 4:
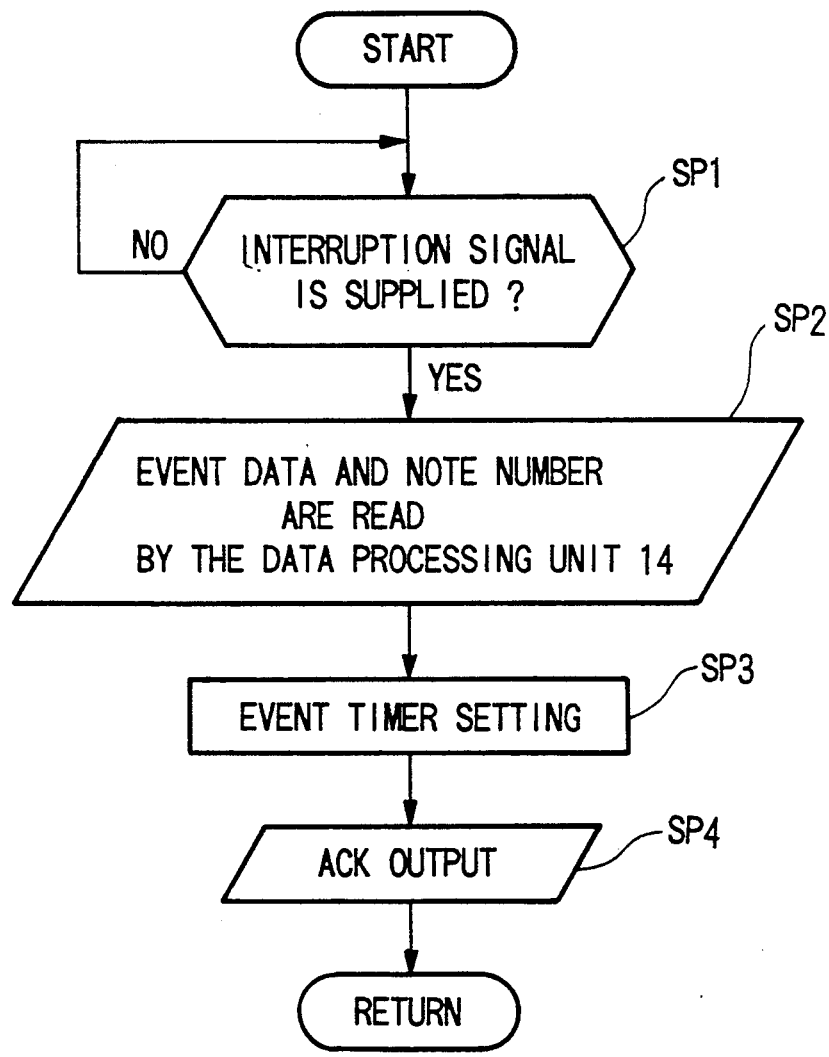
FIG. 4 is a schematic flow chart of the controller of FIG. 1 in another operating condition.

Here, the interruption executed by the data processing unit 14 is explained, with FIG. 4 showing a schematic flow chart of the controller of FIG. 1 in another operating condition. First, in the decision box at step SP-1, it is detected whether or not the interruption request signal is supplied. If the criteria is not satisfied in step SP-1, the procedure repeats this step, if on the other hand, the criteria is satisfied, the procedure proceeds to the next box.

In the next box, step SP-2, the event data and the note number are read by the data processing unit 14, the event data is supplied from the event detector in which events occur, and the note number is supplied from the timing controller 15, in order to determined the elements of the state changes. In the next box, step SP-3, each of the times at which an event occurs, is set at the data processing unit 14 by the event data from the event detectors 18 and 19.

In the next box, step SP-4, an acknowledge signal (ACK) is supplied to the timing controller 15, this ending the routine.

When the timing controller 15 receives the acknowledge signal, it controls all the LEDs of the sensor units and restarts the scanning.

Additionally the data processing unit 14 executes the other operations as follow below, in additional to the above interruption routine.

The data processing unit 14 measures and calculates the time differences between both events of the first hammer sensor and the second one, reads the velocity of the hammer head 33 corresponding to the difference from the described table in the ROM 12, and supplies the strike velocity as a MIDI signal velocity value to outer instruments.

One advantage of the present controller is that the load on the LED decreases due to the repeatedly turned on and off scanning control of the LED of the each sensor unit, thereby shortening the luminescence time of the LED. The life of an LED is determined by the product of luminescence time multiplied by the value of the current flow through the device. In light of this fact, in the present invention, because the luminescence time of the LED in accordance with the embodiment is extremely short, even should the current become large, making the light quantity great, the load on the LED can be mitigated.

Because the LED is turned off before the next element is scanned, the output waveform of the PD corresponding to the LED falls completely to "0" during this off period, even in the case of waveform rounding. Therefore, cross talk does not arise.

Furthermore, if devices of the high luminous efficacy type having little variation are used, the output waveform is made uniform thereby making it possible to further increase the scanning speed.

While the invention has been described with respect to providing a controller to detect the states of a plurality of control elements, it will be understood that the invention is also applicable to other controllers used to detect a precise state of a single element, wherein a pair of an LED and a photodiode are provided and the LED is not continuously turned on. The invention is defined by the following claims.

I claim:

1. A photosensor controller for use in a musical instrument equipped with a plurality of elements for operation, comprising:
   a) a plurality of luminescing means for emitting light;
   b) a plurality of detecting means for detecting light emitted by said luminescing means, wherein each of said detecting means forms a pair with a respective one of said luminescing means for each of said elements, detecting the light emitted therefrom, and thereby detecting operations in said elements;
   c) a driving means for driving said pairs of luminescing means and detecting means in sequence wherein, said luminescing means is driven by said driving means for a first period of time and said detecting means scans said luminescing means during a portion of said first period of time, and, following elapse of said first time period, said luminescing means is extinguished, and after a second period of time said driving means drives a subsequent pair of said luminescing means and said detecting means in sequence.

2. A photosensor controller according to claim 1, wherein an LED is utilized in said luminescing means and a photodiode is utilized in said detecting means, each anode of said photodiode being connected to a power source and each cathode of said photodiode being connected to a common terminal, said common terminal having an electric potential utilized as a detection signal of said detecting means.

3. A photosensor controller for use in a musical instrument equipped with a plurality of elements for operation, comprising:
   a) a plurality of luminescing means for emitting light;
   b) a plurality of detecting means for detecting light emitted by said luminescing means, wherein each of said detecting means forms a pair with a respective one of said luminescing means for each of said elements, detecting the light emitted therefrom, and thereby detecting operations in said elements;
   c) driving means for driving said pairs of luminescing means and detecting means in sequence wherein said luminescing means is driven for a first period of time and said detecting means scans said luminescing means during a portion of said first period of time, and, following elapse of said first time period, said luminescing means is extinguished and after a second period of time said driving means drives a subsequent pair of said luminescing means and said detecting means in sequence; and
   d) means for outputting a status variation signal when said detecting means detects a change in status of said luminescing means from a previous scan of said luminescing means;
   wherein an LED is utilized in said luminescing means and a photodiode is utilized in said detecting means, each anode of said photodiode being connected to a power source and each cathode of said photodiode being connected to a common terminal, said common terminal having an electric potential utilized as a detection signal of said detecting means.

4. A photosensor controller according to claim 3, wherein said driving means outputs data indicative of said elements of operation which are being driven by said driving means.

5. A photosensor controller according to claim 4 wherein said driving means outputs an interrupt request signal when said status variation signal is output.

6. A photosensor controller according to claim 5, wherein said driving means comprises a CPU and a memory device and said driving means initiates interruption handling of said data indicative of said elements of operation according to said interrupt request signal.

7. A photosensor controller according to claim 6 wherein said driving means temporarily pauses said driving of said pair of luminescing means and detecting means, and begins driving said subsequent pair when said interruption handling is finished.

* * * * *